Patented Oct. 19, 1954

2,692,281

UNITED STATES PATENT OFFICE 2,692,281

PREPARATION OF HYDRAZODICARBONAMIDE

Thomas H. Newby, Middlebury, and John M. Allen, West Cheshire, Conn., assignors to United States Rubber Company, New York, N. Y., a corporation of New Jersey No Drawing. Application June 5, 1953, Serial No. 359,958

4 Claims. (Cl. 260—554)

This invention relates to an improved method for the preparation of hydrazodicarbonamide, an intermediate in the preparation of azodicarbonamide which is useful as a chemical blowing agent.

Hydrazodicarbonamide has heretofore been prepared by reacting a hydrazine salt of a non-oxidizing acid (typified by hydrochloric acid and sulfuric acid) with urea according to the following equation:

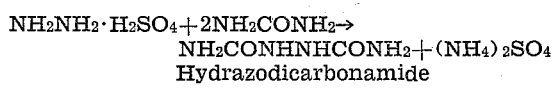

In carrying out this reaction the reagents are dissolved in water and the aqueous solution is refluxed at the boiling point (approximately 100° C.) for several hours, the product precipitating as an insoluble white solid.

A major difficulty with the previous method of preparation of hydrazodicarbonamide is that the yield has not been desirably high. Hydrazine is a relatively expensive chemical and this is reflected in the cost of materials derived from it. Accordingly any means of effecting a substantial increase in the yield of hydrazodicarbonamide from hydrazine is commercially very important.

Our invention is based upon the discovery that a considerable increase in yield of hydrazodicarbonamide, when prepared by the general method described above, can be effected by the simple expedient of maintaining the reaction mixture in a strongly acidic condition throughout the reaction. In practicing our invention we keep the pH from exceeding 4.0 throughout the entire, or substantially the entire, reaction period which generally is of the order of 4 to 5 hours. For example, the pH of the reaction mixture can be controlled throughout the reaction, typically between 1.0 and 4.0, by the intermittent addition of a suitable acidic material, e. g., a non-oxidizing mineral acid or a non-oxidizing acid buffer mixture containing such an acid and usually also containing the ammonium salt of such an acid. Instead of intermittent addition of the acidic material, the pH may be controlled by the continuous addition of such an acidic material during part or substantially all of the reaction time as required.

Because of the ease with which nitric acid oxidizes hydrazodicarbonamide and its hydrolysis products, nitric acid should not be used as the basis of the acidifying agent used to maintain the pH in the practice of our invention. Suitable non-oxidizing mineral acids which can be used include sulfuric acid, phosphoric acid and hydrochloric acid. Suitable hydrazine compounds which can be used in our reaction include monohydrazine sulfate, dihydrazine sulfate, monohydrazine phosphate, monohydrazine hydrochloride, and hydrazine hydrate. If hydrazine hydrate is used, it should be converted to a salt, e. g., monohydrazine sulfate or hydrochloride, before reaction.

Although, in practicing our invention, the average pH of the reaction mixture can be maintained below 2.0, if desired, generally this would require an excessive amount of acidic material and for this reason is not preferred. We prefer to keep the pH at a value ranging from 2.0 to 4.0.

The ordinary concentrated sulfuric acid of commerce (specific gravity approximately 1.84) can conveniently be used to maintain the pH of the reaction mixture in accordance with our invention. Another suitable material for pH maintenance is a buffer solution made by dissolving concentrated sulfuric acid and ammonium sulfate in water.

In practicing our invention we typically use a salt made by reacting one mol of hydrazine ($NH_2NH_2$) with one mol of a non-oxidizing mineral acid such as is mentioned above. Monohydrazine sulfate is an extremely convenient example of such a salt.

We prefer to utilize a salt of hydrazine having a highly acidic nature, e. g., monohydrazine sulfate or phosphate, since this gives an initial reaction mixture having a pH below 4.0 We can achieve the same effect by using a less acidic salt of hydrazine, e. g., dihydrazine sulfate, and incorporating in the original reaction mixture a suitable proportion of acidic material of the type mentioned above.

We often employ a reaction mixture having an initial pH below 4.0 and allow the pH to rise to a value of not over 4.0, whereupon we introduce the acidic material continuously or intermittently in such a way as to keep the pH from exceeding 4.0, and preferably to maintain it between 2.0 and 4.0, until the reaction is substantially complete, i. e., until substantially the total reaction time has elapsed, say until 4½ hours of a total period of 5 hours have elapsed.

The reaction is almost invariably carried out by boiling a mixture of the hydrazine salt, the urea and water under refluxing conditions with agitation. The amount of water should be such as to maintain the reaction mixture fluid and to maintain the reactants in solution. At the end of the reaction period the reaction mixture is simply cooled and the hydrazodicarbonamide is then separated mechanically, usually by filtration, and washed with water.

The molar ratio of urea to hydrazine is usually considerably in excess of the theoretical (2:1) so as to provide for the complete utilization of all of the relatively expensive hydrazine. This molar ratio will typically range from 2.5:1 to 4.0:1.

The following examples illustrate our invention in more detail. All parts are by weight.

Example I

A mixture of 200 parts of monohydrazine sulfate, 270 parts of technical urea and 300 parts of water was heated to the refluxing temperature under refluxing conditions and with agitation. After about two hours of boiling the pH had risen to 4.0 whereupon a total of 63 parts of commercial concentrated sulfuric acid was added dropwise at such a rate as to hold the pH at a level between 2 and 2.5. After two and three quarter hours of additional boiling the acid addition was discontinued and the pH of the mixture was allowed to rise while the mixture was boiled for a further period of fifteen minutes. The reaction was discontinued at the end of five hours total elapsed time. The reaction mixture was then cooled and filtered and the filtered precipitate was washed. The yield was 173 parts or 98% of theoretical.

Example II

Example I was duplicated except that the pH of the reaction mixture was not controlled by the addition of acid and was allowed to rise to 6.5 after two hours and allowed to stay at approximately 7.2 for the rest of the five-hour reaction period. The yield was only 82% of theoretical.

Having thus described our invention, what we claim and desire to protect by Letters Patent is:

1. In the formation of hydrazodicarbonamide by heating a reaction mixture comprising an aqueous solution of urea and of a non-oxidizing mineral acid salt of hydrazine, the improvement which comprises maintaining the pH of the reaction mixture at not over 4.0 during the reaction by adding an acidic material selected from the group consisting of non-oxidizing mineral acids and non-oxidizing mineral acid buffer mixtures containing a non-oxidizing mineral acid.

2. A method as set forth in claim 1 wherein said acidic mineral is a non-oxidizing mineral acid.

3. A method as set forth in claim 1 wherein said salt is a sulfuric acid salt of hydrazine and wherein said acidic material is sulfuric acid.

4. A method as set forth in claim 1 wherein said salt is monohydrazine sulfate and wherein the pH of the reaction mixture is allowed to rise to a value of 4.0 after which sulfuric acid is added gradually at such a rate as to maintain the pH at a value of from 2.0 to 2.5 until substantially the total reaction time has elapsed.

No references cited.